United States Patent
Bauer et al.

(10) Patent No.: US 12,196,645 B1
(45) Date of Patent: Jan. 14, 2025

(54) SYSTEMS AND METHODS FOR MEASURING MATERIAL DEGRADATION

(71) Applicant: National Technology & Engineering Solutions of Sandia, LLC, Albuquerque, NM (US)

(72) Inventors: Stephen J. Bauer, Albuquerque, NM (US); William Payton Gardner, Missoula, MT (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 1147 days.

(21) Appl. No.: 16/227,785

(22) Filed: Dec. 20, 2018

Related U.S. Application Data

(60) Provisional application No. 62/609,159, filed on Dec. 21, 2017.

(51) Int. Cl.
| | |
|---|---|
| *E21B 43/26* | (2006.01) |
| *E21B 47/11* | (2012.01) |
| *E21B 49/00* | (2006.01) |
| *G01M 5/00* | (2006.01) |
| *C09K 8/80* | (2006.01) |
| *C09K 11/06* | (2006.01) |

(52) U.S. Cl.
CPC .......... *G01M 5/0033* (2013.01); *E21B 43/26* (2013.01); *E21B 47/11* (2020.05); *E21B 49/00* (2013.01); *C09K 8/80* (2013.01); *C09K 11/06* (2013.01)

(58) Field of Classification Search
CPC .......... E21B 47/11; E21B 43/26; E21B 49/00; C09K 8/80; C09K 11/00
See application file for complete search history.

(56) References Cited

U.S. PATENT DOCUMENTS

| | | | |
|---|---|---|---|
| 2009/0288820 A1* | 11/2009 | Barron | C04B 35/62894 166/250.1 |
| 2010/0307745 A1* | 12/2010 | Lafitte | E21B 47/11 166/250.12 |
| 2011/0277996 A1* | 11/2011 | Cullick | E21B 43/16 166/250.12 |
| 2013/0126158 A1* | 5/2013 | Gupta | E21B 47/11 166/250.12 |

* cited by examiner

*Primary Examiner* — Alicia Bland
(74) *Attorney, Agent, or Firm* — Daniel J. Jenkins

(57) ABSTRACT

Systems and methods that measure material deformation by measuring a tracer gas that has been added to or is present in an engineered material that is subsequently released from the material, measured, and correlated to a change in a property of the material upon a stress/strain being applied to the engineered material.

13 Claims, 5 Drawing Sheets

SYSTEMS AND METHODS FOR MEASURING MATERIAL DEGRADATION

RELATED APPLICATION

This application claims priority to U.S. Provisional Patent Application No. 62/609,159, filed on Dec. 21, 2017, entitled "Systems and Methods for Measuring Material Degradation," the entirety of which is incorporated herein by reference in its entirety.

STATEMENT OF GOVERNMENT INTEREST

This invention was developed under Contract No. DE-NA0003525 awarded by the United States Department of Energy/National Nuclear Security Administration. The Government has certain rights in this invention.

FIELD

The present disclosure is generally directed to systems and methods for measuring material degradation, and is more particularly directed to systems and methods that use engineered materials with tracer gas additions that are used as an indication of a change of a property of the material upon release of the tracer gas from the material.

BACKGROUND

The study of material deformation includes the use of electromechanical sensors to measure stress and/or strain within the material. There may be circumstances when taking stress/strain measurements are impractical, for example when taking such measurements endangers worker health and safety, the material is inaccessible, the materials are in situ, when stress/strain rates are small, and/or when stress/strain is non-localized. In such cases, the use of sensors may not be practical and/or may not lead to accurate measurements.

For example, in boreholes, secondary indicators of deformation are used to indicate material degradation. These secondary indicators include changes in acoustic properties, electromagnetic variations, and temperature fluctuations. In some applications, the data collection process is dangerous to the operator. For example, in nuclear reactors, physical inspections are performed that are dangerous to the worker. In a nuclear waste cask or repository, access to make direct inspect for damage may be prohibited.

Therefore, what is needed are new systems and methods that can passively and accurately measure material degradation under a wide range of circumstances.

SUMMARY OF THE DISCLOSURE

According to an embodiment of the disclosure, a method for detecting a material degradation is disclosed that includes fixing within an engineered material an amount of a tracer gas and sensing an amount of tracer gas that is released within the engineered material when the engineered material is in a stress/strain state.

According to another embodiment of the disclosure, a method for fabricating an engineered material is disclosed that includes forming the engineered material and homogeneously adding and fixing a tracer gas within the engineered material at the time of formation of the engineered material.

According to another embodiment of the disclosure, a method for fabricating an engineered material is disclosed that includes forming the engineered material base and homogeneously adding and fixing a tracer gas within the engineered material base by diffusing the tracer gas into the formed engineered material base to form the engineered material.

DETAILED DESCRIPTION OF THE DISCLOSURE

Figure 1:
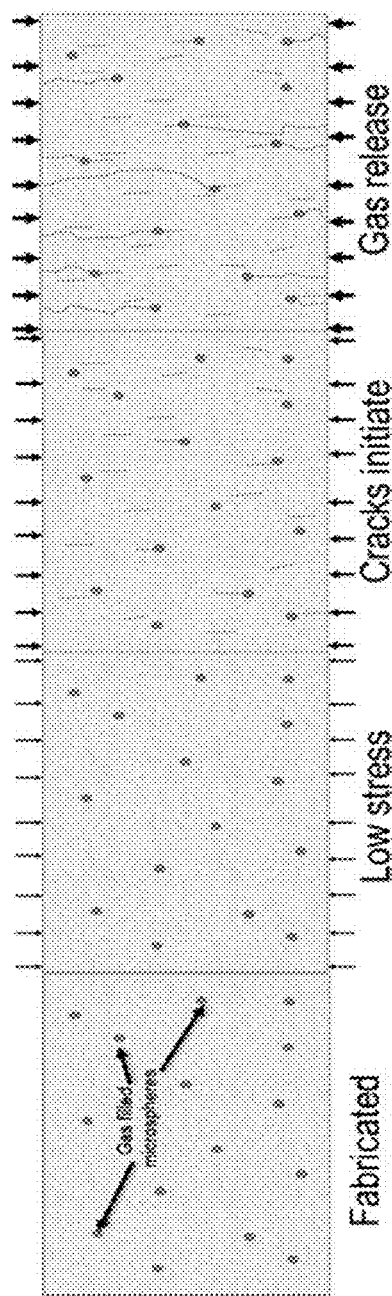
FIG. 1 illustrates a tracer gas release pathway according to an embodiment of the disclosure.

The present disclosure is directed to systems and methods that measure material deformation by measuring, sensing or detecting a tracer gas added to or present in an engineered material that is subsequently released from the material when the material is put under a stress/strain. The tracer gas is added homogeneously to the engineered material. The measured tracer gas may be correlated to a change in a property of the material. The transport of gases may be within the material, along grain boundaries, in the pore fluid, and/or within the micro to macro fracture network, and then released from the material. The transport is a function of the stress/strain state of the material and its control on chemical processes and the physical configuration of the grain and fracture networks. Stress/strain may be applied directly on the material or may be the result of a change in an environmental factor such as a change in temperature, pressure, changes in geologic stress field applied to the material, and/or hydrostatic stress fluctuations applied to the material. In another embodiment, changes to the chemical environment may also cause the material to degrade and release the tracer gas.

According to an embodiment of the disclosure, the disclosed systems and methods may be used to correlate the release, detection and/or measurement of tracer gas as a function of stress/strain or other material change. In an embodiment, the release of the tracer gas may be correlated to deformation/fracture of the material. Gas release may be correlated to amounts of permanent deformation, plastic strain, number of microfractures, volume of permanent deformation and dilation. The detection and/or measurement of tracer gas released from a material may be correlated to stress/strain or other environmental conditions, such as, but not limited to temperature, pressure and chemical changes such as material dissolution or degradation, though laboratory measurements under controlled conditions.

In an embodiment, the released and measured tracer gas may be used as a sensor of changes in stress or strain state. In an embodiment, the tracer gas may be detected, sensed and/or measured at one or more points adjacent and/or proximate to the material to sense and/or measure the release of the tracer gas. For example, released tracer gas may be sensed and/or measured using a mass spectrometer, chemical sensors, optical excitation, laser ring-down spectroscopy or other measuring/sensing device. The tracer gas may be measured at or away from the sensing of the tracer gas at the material. In another embodiment, the tracer gas may be detected, sensed and/or measured within the material when the tracer gas is adsorbed, absorbed, adhered or otherwise immobilized within the engineered material. For example, a sensor or probe may be disposed or positioned within the engineered material so that when the material is under a stress/strain, the tracer gas, in this example contained within polymer spheres or hollow microspheres, is released in a manner to flow within the material to be detected, sensed and/or measured.

As materials undergo deformation, they release gases held in material. If the gas released is significantly different in composition from the surrounding ambient gas or atmosphere, the release of gas can then be used as a signal of deformation. Tracer gas may be dispersed homogeneously throughout the engineered material and then used as a sensor of changes in stress or strain state of the material. The gas may be added to the material (doped) in a variety of fashions depending on the material properties and deformation type. Gas could be included during the fabrication of parts of the engineered material or placed in the bulk material. Gas could be homogeneously diffused into the material, impregnated by bombardment, or entrapped by during solidification. Tracer gases could also be naturally accumulated in materials through such processes as radioactive decay and/or nuclear or chemical reaction.

The engineered material, herein also referred to as the material, may be a material such as, but not limited to cements, concretes, aggregates, glass, ceramics, cermets, and organic compounds. The term "cement" in this disclosure in an embodiment, the organic compounds may be, but are not limited to plastics, epoxies and urethanes. The materials may be reinforced, for example, cements/concretes may be reinforced with rebar, plastics/epoxies with ceramic/metal fibers.

The tracer gas may be introduced into the material by adding the tracer gas at the time of creation of the material or may be introduced into the material after the material is formed. In an embodiment, the tracer gas may be added at the time of the fabrication of the material by adding the tracer gas by adding a tracer gas constituent at the time of fabrication. In an embodiment, the tracer gas may be introduced by introducing a host or carrier material containing or including the tracer gas into the material fabrication constituents. For example, the gas may be added in foam bubbles, contained within glass or synthetic beads/bubbles, impregnated in glass or synthetic beads/bubbles, and/or contained in a framework structure. In an embodiment, the synthetic beads may be urethane or glass microspheres. In an embodiment, the gas may be entrained in the spheres at the time of sphere formation or the gas may be diffused into the microspheres. In an embodiment, the gas may be introduced during a foamed cement fabrication process. In other embodiments, tracer gas may be impregnated or diffused into a crystal lattice of a mineral, such as quartz particles or fragments, or other material of the engineered material at elevated temperature and gas pressure in the engineered material.

In another embodiment, the tracer gas may be absorbed, adsorbed or otherwise adhered to a host material and introduced into the material. The tracer gas is then desorbed or otherwise released from the host material upon a stress/strain. For example, a tracer gas may be adsorbed onto a ceramic particle host material and thereafter released upon a stress/strain.

In another embodiment, the tracer gas may be directly introduced into the material constituents at the time of material formation. For example, the tracer gas may be introduced into the material formation by injecting the gas into material formation materials. For example, a tracer gas may be injected into a cement/concrete formulation. In other embodiments, a tracer gas may be introduced into mineral grains of the material by heating the material and diffusing the tracer gas at the time of formulation of the material or by heating the material once made and subsequently diffusing the tracer gas into mineral grains of the material.

The tracer gas may be any gas capable of release from the material upon a change of stress/strain of the material. In an embodiment, the tracer gas may be a noble gas. The noble gas may be one or more gases including helium (He), neon (Ne), krypton (Kr), argon (Ar) and xenon (Xe). The noble gas may be specific isotopes that may be used to differentiate from naturally occurring species. Noble gasses are good additive/tracers, as they are inert and highly mobile. In other embodiments, the tracer gas may be isotopically labeled hydrocarbon gases, i.e., methane with a distinct carbon isotopic ratio. In vet other embodiments, the tracer gas may be engineered gases such as refrigerants and insulators, e.g., CFCs and SF6.

The tracer gas is present in the material in an amount that is determined to be released and detected, sensed and/or measured under select stress/strain conditions. In an embodiment, the tracer gas may be present in the material up to 2% by volume.

FIG. 1 illustrates an example of a change in material, material cracking under stress/strain, that causes release of a tracer gas according to an embodiment of the disclosure. As can be seen in FIG. 1, a gas has been introduced into an engineered material within microspheres at the time of fabrication. The tracer gas had been homogeneously placed in the engineered material. Under low stress, the microspheres release the gas such that the gas begins to move or transport within the material. The release may be through rupture or microsphere material changes. such as straining/stressing, that allow for release of the gas. As cracks form in the material under further stress/strain, the gas continues to migrate via advection and diffusion through the material. At some time, the gas migrates to the material's outer boundary at which point the gas may be detected, sensed and/or measured.

The engineered material including the tracer may be incorporated as whole or part of a structure. When this material or an aggregate material which contains the engineered material containing the tracer gas, for example in glass microspheres or impregnated quartz particles or fragments is deformed, the gas may be released and detected/sensed, and thus serve as an indicator of the material's deformation, for example, the stress/strain state or internal temperature. Changes in pressure alone may cause the gas host to deform/fracture. Temperature changes may also cause a material to fracture, releasing gas. Temperature increases may also facilitate gas diffusion from the gas host site, thus temperature excursions may be sensed. Chemical changes may cause a material to materially degrade (e.g., compositional changes) releasing gas. The gas release versus degradation or temperature may be separately calibrated. The composition of gases added would be selected for the material and intended nature of the deformation desired to sensed. The tracer gas release may be sensed locally or remotely.

Data analyses may be used to relate damage such as microcrack population evolution to gas emission and composition evolution. A variety of interpretation methods can be used to interpret released gas data including multi-scale hydro-mechanical-chemical methods. In an embodiment, models can be used in an inverse method to estimate fracture network properties and the associated changes in stress and strain state from the observed gas data. The combination of laboratory/field characterization, theoretical development of the relationship between gas release and deformation, and modeling relate the level of deformation (amount of volume strain) a material has experienced from the release of tracer gas.

The homogeneously "doped" engineered material could be incorporated in part of the whole of a structure. When the doped material is deformed, the tracer gas may be released through fracturing, dilation and cracking, and subsequently detected/sensed in the surrounding atmosphere. Thus, monitoring the concentration of the tracer gas in the atmosphere serves as an indicator of the material's deformation (stress/strain state). The volume of gas released as function of the deformation state can be separately calibrated for a given material type and doping methodology. The composition of gases added and the doping methodology would be dependent upon the material type, the ambient atmosphere, nature of the deformation and/or material degradation which are intended to be sensed, and the ambient sampling conditions.

Sensing of deformation is via the transport of doped gases from the material to the sensor. Transport of gases occurs within the material and in the ambient atmosphere. Transport in the material can occur along grain boundaries, in the pore space between grains and within micro-fractures and the larger macro-fracture network. Material deformation can cause changes in the grain boundary alignment, pore network, and the micro and macro-fracture network. Thus, the transport is a function of the stress/strain state of the material and its control on chemical processes and the physical configuration of the grain and fracture networks. Gas may be sensed at any point along the transport path from the grain to the ambient atmosphere depending upon the application.

The systems and methods can be calibrated for a given material and doping methodology by changing the stress and strain state in a systematic manner by application of stresses while observing released gases. Gas release may then be related to amounts of permanent and/or elastic deformation or material degradation. Measure of deformation could include: elastic strain, plastic strain, number of microfractures and or macrofractures, volume of permanent deformation, volume of material degradation, fracture number/density and fracture location. Post macrofracture release behavior may be important in certain scenarios, for example in analyzing macrofracture properties such as, but not limited to volume, size and connectivity.

Data analyses relates deformation to gas release and gas composition evolution, for example microcrack population evolution to gas emission and composition evolution. The type of data analysis may include a variety of methods ranging from empirical relationships to physically based process models of deformation and gas transport. Multi-scale hydro-mechanical-chemical transport models may be utilized to interpret gas release and mechanical data. These models can be used in an inverse sense to estimate changes in gas release and transport properties and/or material damage from the observed gas release signal. For example, the gas release data could be used to estimate changes in the fracture network properties and the associated changes in stress and strain state. The combination of laboratory/field characterization, theoretical development. and modeling relate the level of deformation (amount of volume strain) a material has experienced from the release of tracer gas.

The gas release may be sensed locally or remotely. Gas composition could be monitored with a variety of techniques. Gas composition could be monitored periodically through individual samples, or continuously monitored with an individually deployed and dedicated monitoring device. Samples of gas could come from within the engineered material using dedicated sampling ports, or from the ambient atmosphere surrounding the material. Dedicated sampling ports could be directly connected to the pore space using gas permeable membranes or other technologies.

The type of sampling protocol, sampling methods and analytical procedure depends upon the desired monitoring level, the type of engineered material and the type of tracer gas used. Analytical procedures may include gas chromatography, mass spectrometry or laser ring-down spectroscopy. These analytical devices could be deployed onsite or samples could be collected on site and brought back to a laboratory for analytical analysis. The analytical method and sampling procedure are co-designed in order to ensure that the detection limit remains low enough for the purpose of intent.

In an example, a type G cement that is often used as an oil well cement liner, with a water/cement ratio of 0.45 was fabricated and cured for 3 days at 50° C. The cylindrical samples (3.8 cm diameter×7.6 cm) were subjected to 10 MPa helium pressure for 48 hours at 80° C. The pressure was relieved over 72 hours. During the doping period, helium diffused into macro-porosity and micro-porosity in the cement. In a test, the samples were compressed under triaxial compression with 300 psi confining pressure. The results of the text are shown in FIG. 2.

Figure 2:
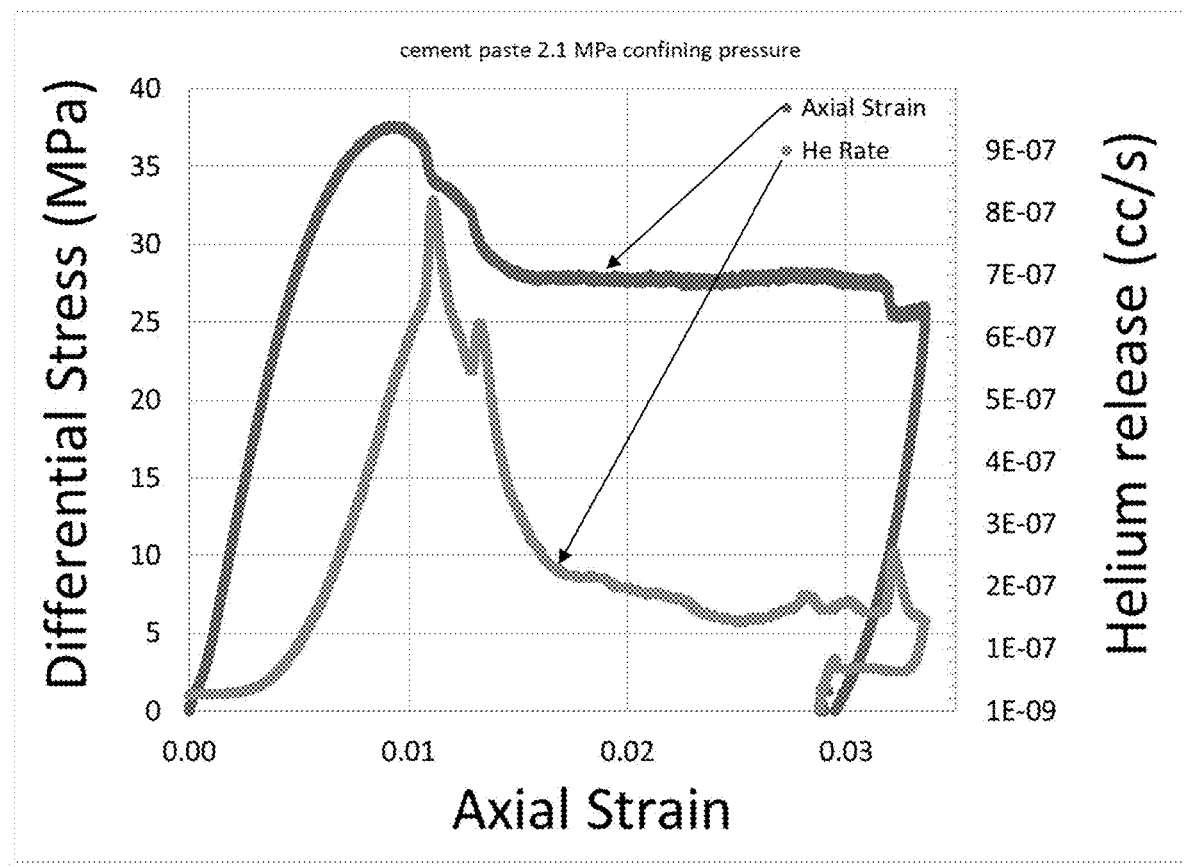
FIG. 2 shows the relationship between gas release and stress/strain according to an exemplary embodiment of the disclosure.

FIG. 2 shows differential stress versus axial strain and helium release versus axial strain in a test according to an embodiment of the disclosure. In this test, the cement sample is first hydrostatically pressurized. The sample experiences increasing axial load causing it to deform (strain). Axial strain and real-time helium release (using mass spectrometry) for the sample are recorded. At about 0.003 axial strain, helium begins to be sensed during the deformation, indicating microfracturing as indicated using real-time sensing (using mass spectrometry) of released gas. The helium release continues during the deformation, is precursive to macroscopic failure of the cement, and the flow rate decreases after macroscopic failure.

Figure 3:
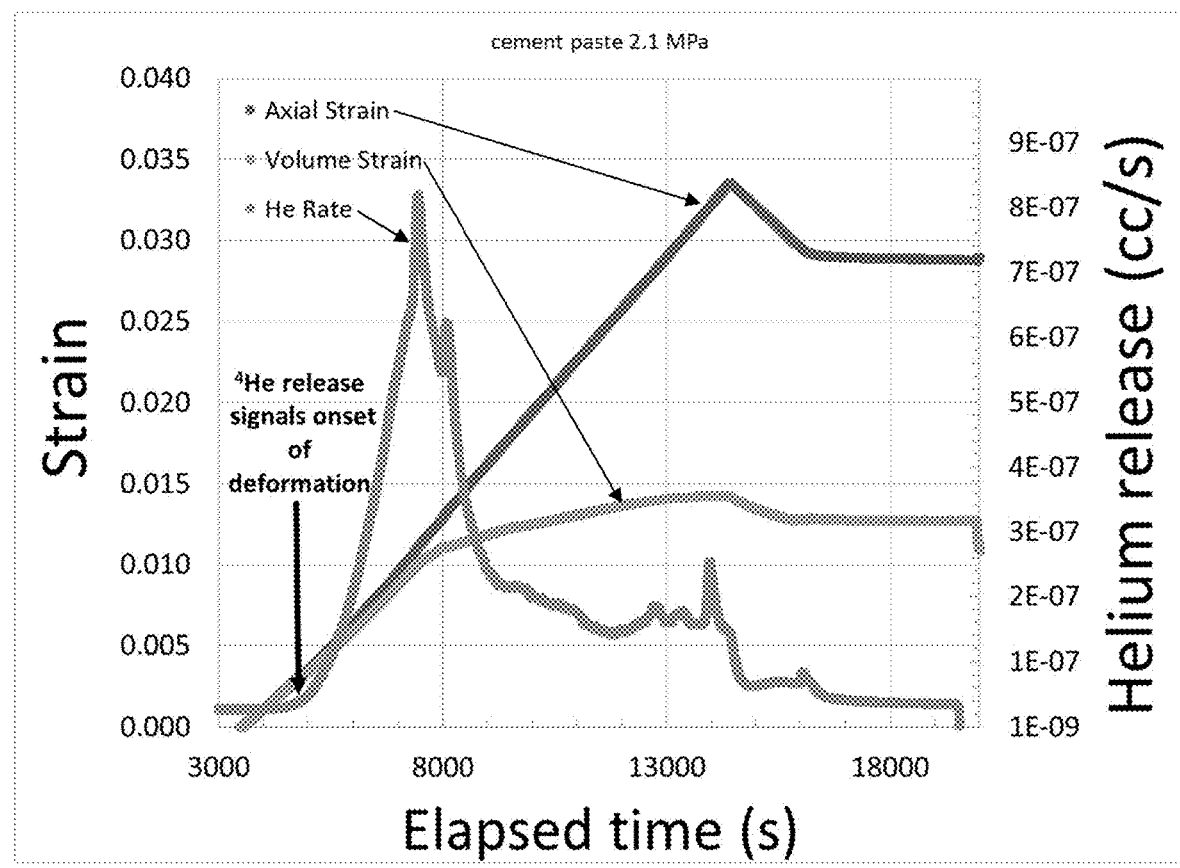
FIG. 3 shows axial strain and volume strain versus elapsed test time and helium release versus elapsed test time in a test according to an embodiment of the disclosure.

FIG. 3 shows axial strain and volume strain versus elapsed test time and helium release versus elapsed test time in a test according to an embodiment of the disclosure. In this test, the cement sample is first hydrostatically pressurized. Beginning at test time 3600 s, the sample experiences increasing axial load causing it to deform (strain). Axial strain and volume strain and real-time helium release (using mass spectrometry) for the sample are recorded. At test time 4800 s, helium begins to be sensed during the deformation, indicating microfracturing and real-time sensing (using mass spectrometry) of released gas. The helium release continues during the deformation, is precursive to macroscopic failure of the cement, and the flow rate decreases after macroscopic failure and during unloading of the sample.

Figure 4:
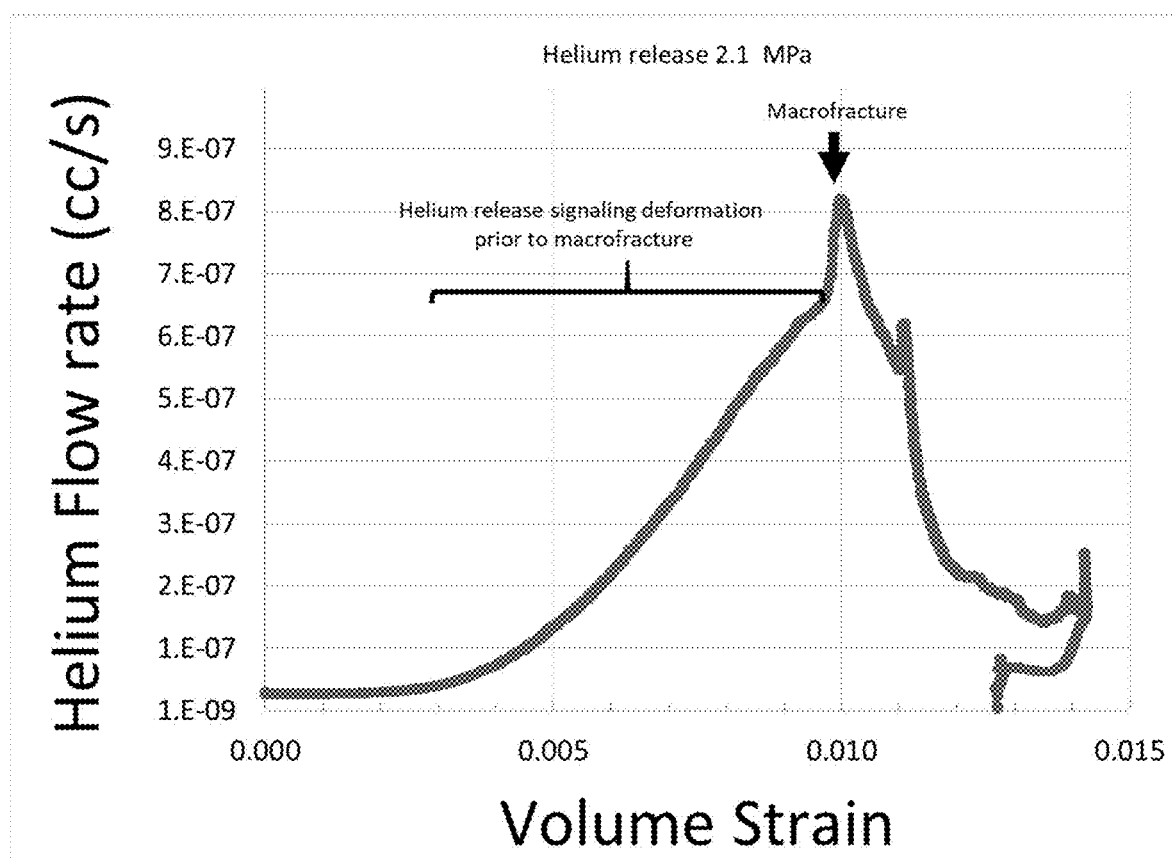
FIG. 4 shows real-time helium flow rate versus volume strain in a test according to an embodiment of the disclosure.

FIG. 4 shows real-time helium flow rate versus volume strain in a test according to an embodiment of the disclosure. In this test, the cement sample is first hydrostatically pressurized. The sample experiences increasing axial load causing it to deform (strain). Volume strain and real-time helium release (using mass spectrometry) for the sample are recorded. At about 0.003 volume strain, helium begins to be sensed during the deformation, indicating microfracturing as indicated using real-time sensing (using mass spectrometry) of released gas. The helium release continues during the deformation, is precursive to macroscopic failure of the cement, and the flow rate decreases after macroscopic failure and during unloading of the sample.

Figure 5:
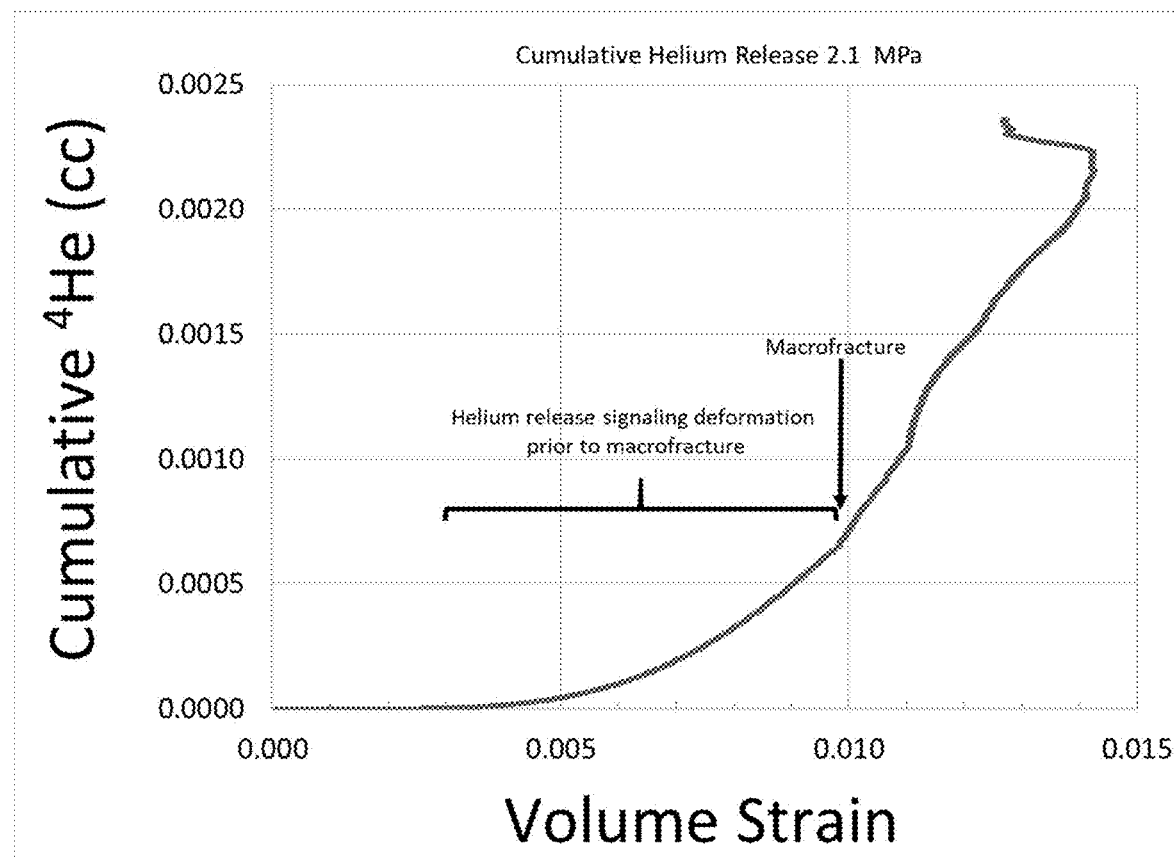
FIG. 5 shows test results for real-time cumulative helium release versus volume strain rate according to an embodiment of the disclosure.

FIG. 5 shows real-time cumulative helium release versus volume strain in a test according to an embodiment of the disclosure. In this test, the cement sample is first hydrostatically pressurized. The sample experiences increasing axial load causing it to deform (strain). Volume strain and real-time helium release (using mass spectrometry) for the sample are recorded. The flow rate versus time allows us to calculate the real-time volume of gas released. At about 0.003 volume strain, helium begins to be sensed during the deformation, indicating microfracturing as indicated using real-time sensing (using mass spectrometry) of released gas. The helium accumulation continues during the deformation, the gas accumulation is precursive to macroscopic failure of the cement, and the accumulation rate decreases after macroscopic failure.

In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A method for detecting a strained state of an engineered material, comprising:
   homogeneously fixing within the engineered material an amount of a tracer gas when forming the engineered material;
   applying a stress to the engineered material to release the tracer gas from the engineered material; and
   sensing an amount of tracer gas released from within the engineered material and associating the amount of tracer gas sensed to the strained state within the engineered material;
   wherein the engineered material is selected from the group consisting essentially of glass, ceramics and cermets.

2. The method of claim 1, further comprising:
   correlating the amount of the sensed tracer gas to a state of the engineered material.

3. The method of claim 2, wherein the state of the engineered material is selected from a group consisting of fracture volume, fracture size, fracture number/density and fracture location.

4. The method of claim 1, wherein the tracer gas is fixed in the engineered material by disposing the tracer material within glass or polymer microspheres or beads or by diffusing the tracer gas into a crystalline or amorphous material within the engineered material.

5. The method of claim 1, wherein the tracer gas is fixed in the engineered material by diffusing the tracer gas into a crystalline or amorphous material within the engineered material.

6. The method of claim 1, wherein the stress is directly applied to the engineered material.

7. The method of claim 1, wherein the strained state in the engineered material results from a temperature change or material chemical modification or degradation to the engineered material.

8. The method of claim 1, wherein the tracer gas is fixed in the engineered material by diffusing the tracer gas into crystalline material within the engineered material.

9. The method of claim 1, wherein the tracer gas is selected from a group consisting of noble gases, gases with specific isotopic composition and engineered gases.

10. The method of claim 9, wherein the engineered gases are selected from a group consisting of refrigerants and insulators.

11. The method of claim 1, wherein the tracer gas is fixed to a carrier material disposed within the engineered material.

12. The method of claim 11, wherein the carrier material comprises quartz particles or fragments.

13. The method of claim 11, wherein the carrier material is ceramic particles.

* * * * *